US007636775B2

(12) United States Patent
Moineau

(10) Patent No.: US 7,636,775 B2
(45) Date of Patent: Dec. 22, 2009

(54) DIGITAL NETWORK MODEM WITH AN INTEGRATED DHCP SERVER

(75) Inventor: Gilbert Moineau, Lachine (CA)

(73) Assignee: Dialogic Corporation, Montreal, Quebec (CA)

( * ) Notice: Subject to any disclaimer, the term of this patent is extended or adjusted under 35 U.S.C. 154(b) by 283 days.

(21) Appl. No.: 11/360,574

(22) Filed: Feb. 24, 2006

(65) Prior Publication Data

US 2006/0206625 A1    Sep. 14, 2006

Related U.S. Application Data

(63) Continuation of application No. 09/830,475, filed on Sep. 24, 2001, now abandoned.

(51) Int. Cl.
*G06F 15/177* (2006.01)
*G06F 11/00* (2006.01)

(52) U.S. Cl. ............... 709/221; 709/209; 709/219; 370/242; 370/245; 370/253

(58) Field of Classification Search ............ 709/208, 709/250, 242, 245; 370/352–356, 400, 401, 370/410, 475, 389, 242, 245
See application file for complete search history.

(56) References Cited

U.S. PATENT DOCUMENTS

| 6,009,103 | A | * | 12/1999 | Woundy | 370/401 |
| 6,012,088 | A | * | 1/2000 | Li et al. | 709/219 |
| 6,021,429 | A | * | 2/2000 | Danknick | 709/208 |
| 6,118,768 | A | * | 9/2000 | Bhatia et al. | 370/254 |
| 6,178,455 | B1 | * | 1/2001 | Schutte et al. | 709/228 |
| 7,099,338 | B1 | * | 8/2006 | Lee | 370/401 |
| 2003/0198215 | A1 | * | 10/2003 | Merrill et al. | 370/351 |
| 2006/0129938 | A1 | * | 6/2006 | Humpleman et al. | 715/734 |

FOREIGN PATENT DOCUMENTS

| AU | 3572697 | | 3/1998 |
| EP | 0843440 | A2 | 5/1998 |
| JP | 10164095 | | 6/1998 |
| WO | 9826548 | | 6/1998 |

OTHER PUBLICATIONS

International Preliminary Examination Report (dated Jan. 25, 2001) issued in International Application No. PCT/CA99/01014.
International Search Report (dated Mar. 23, 2000) issued in International Application No. PCT/CA99/01014.

* cited by examiner

*Primary Examiner*—Ashok B Patel
(74) *Attorney, Agent, or Firm*—Weingarten, Schurgin, Gagnebin & Lebovici LLP

(57) ABSTRACT

The digital network modem has a built-in Dynamic Host Configuration Protocol (DHCP) mechanism for dynamically assigning network addresses to clients on the local network. To prevent confusion with a potentially existing DHCP server on the local network, an autosense mechanism is provided to detect the existence of a DHCP server and disable the internal, built-in DHCP mechanism. At power-on, the modem has no knowledge of clients on the local network, and the addresses in use are checked prior to operation. Addresses in use are placed in a list in a store of unknown addresses, and are not assigned to clients requesting DHCP addresses. When a DHCP client requests an address and has as its current address one of the addresses on the list, the current address is removed from the list. The list of unusable addresses is thus minimized and the same address will not be used for two clients.

10 Claims, 1 Drawing Sheet

DIGITAL NETWORK MODEM WITH AN INTEGRATED DHCP SERVER

CROSS-REFERENCE TO RELATED APPLICATIONS

The present application is a continuation of U.S. application Ser. No. 09/830,475 filed Sep. 24, 2001, now abandoned and which claims priority through International Patent No. PCT/CA99/01014 from Provisional Patent Application No. 2,252,207 filed Oct. 30, 1998, the specifications of which are hereby incorporated by reference.

FIELD OF THE INVENTION

The present invention relates to a digital network modem, such as an ISDN or a DSL modem, and more particularly to a digital network modem having a dynamic host configuration protocol (DHCP) server function integrated into the modem.

BACKGROUND OF THE INVENTION

To facilitate network management in local area networks (LANS), it is known to provide servers called dynamic host configuration protocol or DHCP servers. These servers respond to requests from clients connected to the network to receive assigned dynamic addresses for communication purposes on the network. The advantage of using such a dynamic address assignment is that new clients can be added easily, and the effort to manage the addresses used on the network is reduced. In most cases, a DHCP server is provided by software added to a network server.

When a network which was previously not connected to other networks or when a network needs a faster or additional connection to other networks, digital network modems are added to provide the desired connection. Network modems, such as ISDN modems, are assigned an address on the LAN. When DHCP is used, clients on the LAN are assigned their addresses and can recognize the modem as a router or gateway by consulting the DHCP, and in this way, each client does not need to have prior knowledge of any fixed address for the modem.

Computer networks are being installed in more and more residential, office and industrial environments, and the increase in the number of such networks has increased the need for skilled technicians required to configure and maintain such networks. While computer networks were very uncommon a few years ago for home users, it is now economically feasible and desirable to interconnect computer devices in a home environment. Any simplification of the task of network management is important from the perspective of both increased reliability and reduced training for the network manager. DHCP therefore offers many practical advantages in managing a network, even for relatively small networks found in homes or small and medium businesses. While some network administrators have taken the time to obtain and install DHCP, many others have not, particularly in home and small business environments.

While it would be advantageous to provide a DHCP server function integrated with a component to be added to a network, such as a digital network modem, for those who would benefit from a DHCP, it is imperative to avoid installing two DHCP servers on the same network, since the result would be confusion and malfunction. Furthermore, having to choose between one modem including DHCP functionality and another modem without DHCP requires the manufacture, distribution and stocking of separate types of modems, and complicates the purchasing choice.

SUMMARY OF THE INVENTION

It is therefore an object of the invention to provide in a digital network modem (i.e. a router or gateway device) a mechanism for dynamically assigning network addresses on a LAN, such as DHCP, which mechanism has an autosense feature to automatically shut itself off when the modem detects that a similar device is present on the LAN.

According to the invention, there is provided a network modem device comprising an integrated mechanism for dynamically assigning network addresses on a network. The device further comprises a controller circuit connected to the integrated dynamic network address assignment mechanism and detecting the presence of a dynamic address assignment server on the network. The integrated mechanism is disabled when the dynamic address assignment server on the network is detected.

The invention also provides a method of enabling/disabling a mechanism for dynamically assigning network addresses on a network, the mechanism being integrated into a network modem device. The method comprises detecting a presence of a dynamic address assignment server on the network, and disabling the integrated mechanism when the dynamic address assignment server is detected on the network.

It is yet another object of the invention to provide a mechanism for dynamically assigning network addresses on a LAN, such as DHCP, which is able to handle a reinitialization, for example as a result of being turned off and on, without disrupting any clients on the network. According to this feature, the mechanism for dynamically assigning network addresses pings all addresses within its range at power on. The mechanism then reserves any addresses which have responded. New clients requesting dynamic addresses are assigned new addresses within the range, and existing clients request a new address periodically. When an existing client having one of the reserved addresses requests a new dynamic address, the address is removed from the list of unknown and reserved addresses.

BRIEF DESCRIPTION OF THE DRAWINGS

The invention will be better understood by way of the following detailed description of a preferred embodiment with reference to the appended drawings, in which:
  a.

DETAILED DESCRIPTION OF THE PREFERRED EMBODIMENT

Figure 1:
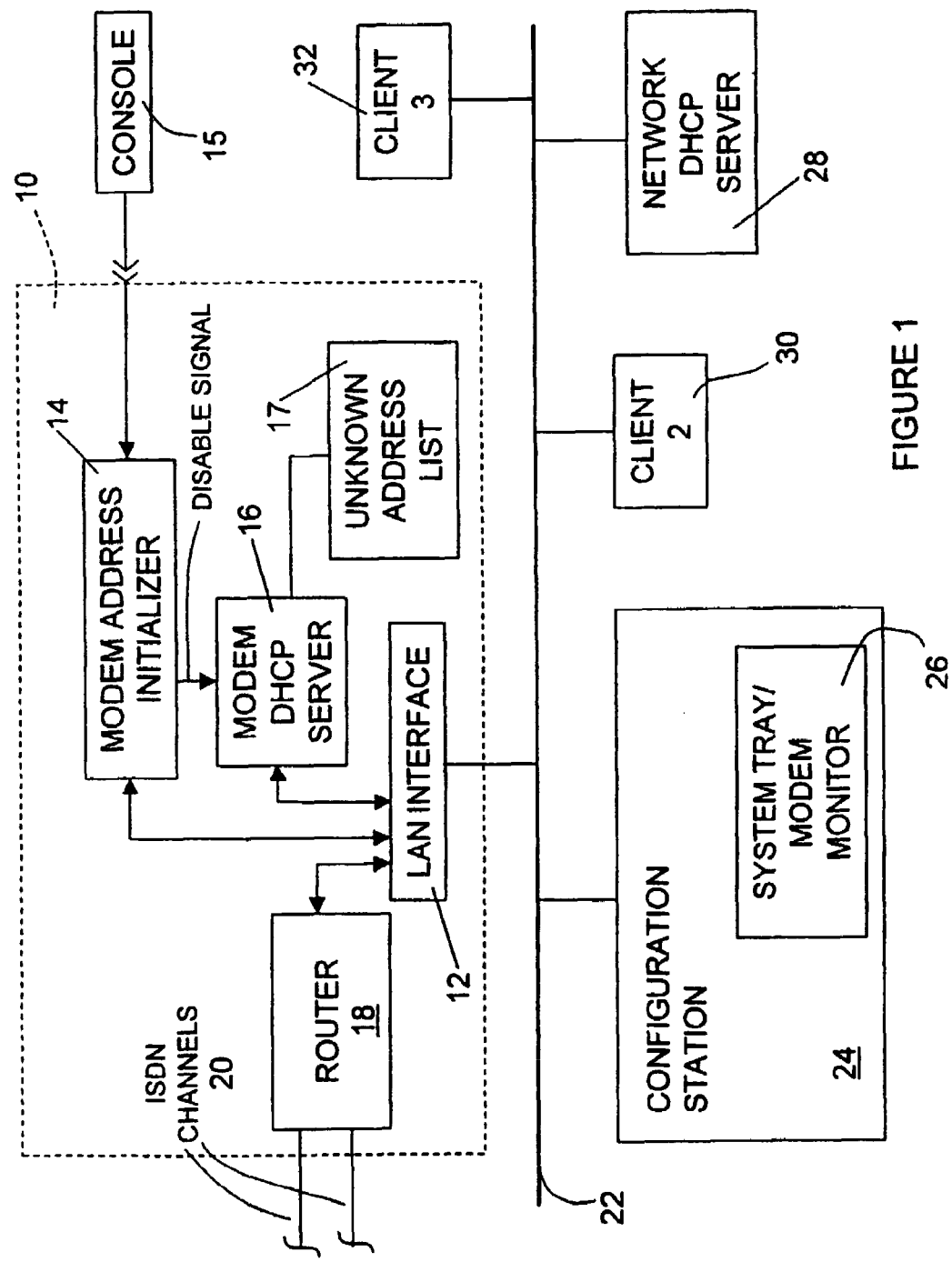
FIG. 1 is a schematic block diagram of the LAN ISDN modem according to the preferred embodiment connected to a LAN to which a configuration station and a network DHCP server are also connected.

As illustrated in FIG. 1, the digital modem 10 according to the preferred embodiment is an ISDN modem having a plurality of functional components shown in FIG. 1. The separation of components illustrated in the separate blocks in FIG. 1 is for the purposes of illustration only, and does not necessarily reflect the physical separation of components in the real device which is built from both hardware and software/firmware components.

When the modem 10 is connected to the Ethernet local area network (LAN) 22 and powered up, a LAN interface 12 and a modem address initializer unit 14 become active. In operation, the modem 10 directs data traffic via router 18 onto the selected ISDN channel 20. The initializer unit 14 broadcasts a DHCP discover message on LAN 22 to detect whether a Dynamic Host Configuration Protocol (DHCP) server 28 is present on the LAN 22. While it is essential to check for the existence of a server 28 at start-up, it is also preferred to check for the existence of such a server 28 periodically.

If a response is received from the server 28, initializer 14 sends a disable signal to the modem's own DHCP server 16. The modem will be assigned a static address, either by direct communication through console 15, or by remote communication at configuration station 24 using the modem monitor program 26.

If no network DHCP server 28 is present on the LAN 22, then no response is received to the DHCP discover message sent by initializer 14. The DHCP server 16 is then not disabled, and it will be able to operate as a DHCP server on network 22. The modem 10 is assigned a static address, either by direct communication through console 15, or by remote communication at configuration station 24 using the modem monitor program 26. When modem 10 functions as a DHCP server, DHCP server 16 will reply to DHCP discover packets broadcasted by clients 30 and 32 (and possibly station 24) to configure their IP addresses. In the preferred embodiment, when the clients 30,32 are using dynamic addresses and the only DHCP server is 16, all the clients are configured by the modem's DHCP component 16 using addresses in the factory defined range of addresses: 192.168.1.2, . . . 192.168.1.50

In the preferred embodiment, a client station 24 includes a modem monitor 26 which allows the user to manually set the active/inactive state of the DHCP server, in the event that the network manager wants to disable the DHCP server 16, or at a later time re-enable the DHCP server 16. The modem monitor interface is HTML-based and provides a simple interface.

Server 16 also handles a reinitialization, for example as a result of being turned off and on, without disrupting any clients on the network. Server 16 pings all addresses within its range at power on. Any addresses which have responded to the ping are placed on a reserved list 17 of unknown status addresses. These unknown addresses could be DHCP clients or static addresses. New clients requesting dynamic addresses are assigned new addresses within the range of the modem and which are not on the reserved list or list of other addresses already assigned to DHCP clients since power on. Existing clients request a new address periodically, based on their lease time, which can vary from minutes to months. When an existing client having one of the reserved addresses requests a new dynamic address, the address is removed from the list of unknown and reserved addresses. This frees up the otherwise reserved address. As will be appreciated, a DHCP server would normally copy all address and lease time data to fixed storage and recover from a shut down by retrieving the data from fixed storage. According to the invention, the DHCP mechanism integrated into the modem does not require fixed storage, due to the use of its start-up check for addresses in-use and subsequent free-up of those addresses belonging to DHCP clients upon renewal.

The invention claimed is:

1. A network modem device, comprising:
   an integrated mechanism operative as a first dynamic address assignment server for dynamically assigning network addresses on a network;
   a controller circuit operative to detect a presence of a second dynamic address assignment server on the network;
   an interrupter operative to send a disable signal to the integrated mechanism for disabling the integrated mechanism in response to the detection of the presence of the second dynamic address assignment server on the network by the controller circuit, the interrupter being further operative otherwise to allow the integrated mechanism to dynamically assign network addresses on the network; and
   a memory store for storing unknown used addresses,
   wherein the integrated mechanism comprises a start-up mechanism for checking availability of addresses on the network and for placing used addresses in the memory store of unknown used addresses, and an address manager for selecting new addresses not included in the store of unknown used addresses and for removing addresses from the store of unknown used addresses when a client having one of the addresses in the store of unknown used addresses requests a dynamically assigned address.

2. The device according to claim 1, wherein said device is a digital network modem.

3. The device according to claim 2, wherein said device is an ISDN modem.

4. The device according to one of claims 1 to 3, wherein said integrated mechanism provides a DHCP server function.

5. The device according to claim 4, wherein said controller circuit broadcasts a DHCP discover message on the network and listens to a response to detect said presence of said server.

6. A method of operating a network modem device, comprising the steps of:
   providing a network modem device including an integrated mechanism operable as a first dynamic address assignment server for dynamically assigning network addresses on a network;
   detecting a presence of a second dynamic address assignment server on the network;
   sending, to the integrated mechanism, a disable signal to disable the integrated mechanism in response to the detection of the presence of the second dynamic address assignment server on the network, and otherwise allowing the integrated mechanism to dynamically assign network addresses on the network;
   checking availability of addresses on the network after power on and loss of memory of previously dynamically assigned addresses;
   storing used addresses in a store of unknown used addresses;
   selecting new addresses not stored in response to a request for a dynamically assigned address; and
   removing an address from the store of unknown used addresses when a client having one of the addresses in the store of unknown used addresses requests a dynamically assigned address.

7. The method according to claim 6, wherein said device is a digital network modem.

8. The method according to claim 7, wherein said device is an ISDN modem.

9. The method according to one of claims 6 to 8, wherein said integrated mechanism provides a DHCP server function.

10. The method according to claim 9, wherein said detecting comprises broadcasting from said device onto said network a DHCP discover message and listening to a response to detect said presence of said server.

* * * * *